United States Patent
Hahne et al.

(10) Patent No.: US 6,933,851 B2
(45) Date of Patent: Aug. 23, 2005

(54) AIR TRAVEL SECURITY METHOD, SYSTEM AND DEVICE

(76) Inventors: Per K. Hahne, 303 Trafalgar Rd., Oakville, ON (CA), L6J 3H1; Ray Wark, 8218 Tenth Line N., Halton Hills, ONT (CA), L0P 1K0

( * ) Notice: Subject to any disclaimer, the term of this patent is extended or adjusted under 35 U.S.C. 154(b) by 268 days.

(21) Appl. No.: 10/225,071

(22) Filed: Aug. 21, 2002

(65) Prior Publication Data

US 2003/0214418 A1 Nov. 20, 2003

Related U.S. Application Data

(60) Provisional application No. 60/381,368, filed on May 20, 2002.

(51) Int. Cl.⁷ ............................................. G08B 23/00
(52) U.S. Cl. ............................... 340/573.4; 340/573.1; 340/539.11; 340/505
(58) Field of Search .................... 340/505, 506, 340/539.1, 539.11, 573.1, 573.4, 945; 244/118.5; 361/179, 232; 235/375, 462

(56) References Cited

U.S. PATENT DOCUMENTS

| | | | |
|---|---|---|---|
| 3,835,673 A | | 9/1974 | Kwan |
| 4,943,885 A | * | 7/1990 | Willoughby et al. ........ 361/232 |
| 5,159,344 A | * | 10/1992 | Robinson et al. ............. 342/44 |
| 5,401,944 A | * | 3/1995 | Bravman et al. ........... 235/375 |
| 5,528,450 A | | 6/1996 | Willoughby et al. |
| 5,841,622 A | * | 11/1998 | McNulty, Jr. ............... 361/232 |
| 6,147,602 A | * | 11/2000 | Bender .................... 340/568.1 |
| 6,246,320 B1 | * | 6/2001 | Monroe ..................... 340/506 |
| 6,766,039 B1 | * | 7/2004 | Al-Sheikh ................. 382/115 |

FOREIGN PATENT DOCUMENTS

DE 10150929 * 10/2001

* cited by examiner

Primary Examiner—Van T. Trieu

(57) ABSTRACT

A method of providing air travel security for passengers traveling via an aircraft comprises situating a remotely activatable electric shock device on each of the passengers in position to deliver a disabling electrical shock when activated; and arming the electric shock devices for subsequent selective activation by a selectively operable remote control disposed within the aircraft. The remotely activatable electric shock devices each have activation circuitry responsive to the activating signal transmitted from the selectively operable remote control means. The activated electric shock device is operable to deliver the disabling electrical shock to that passenger.

59 Claims, 14 Drawing Sheets

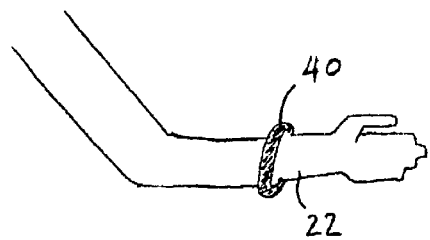
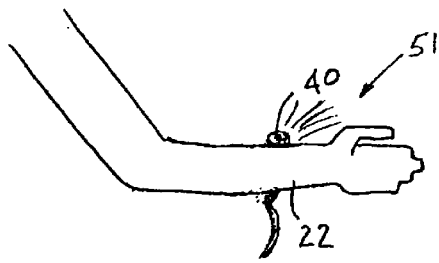
FIG. 3        FIG 3A
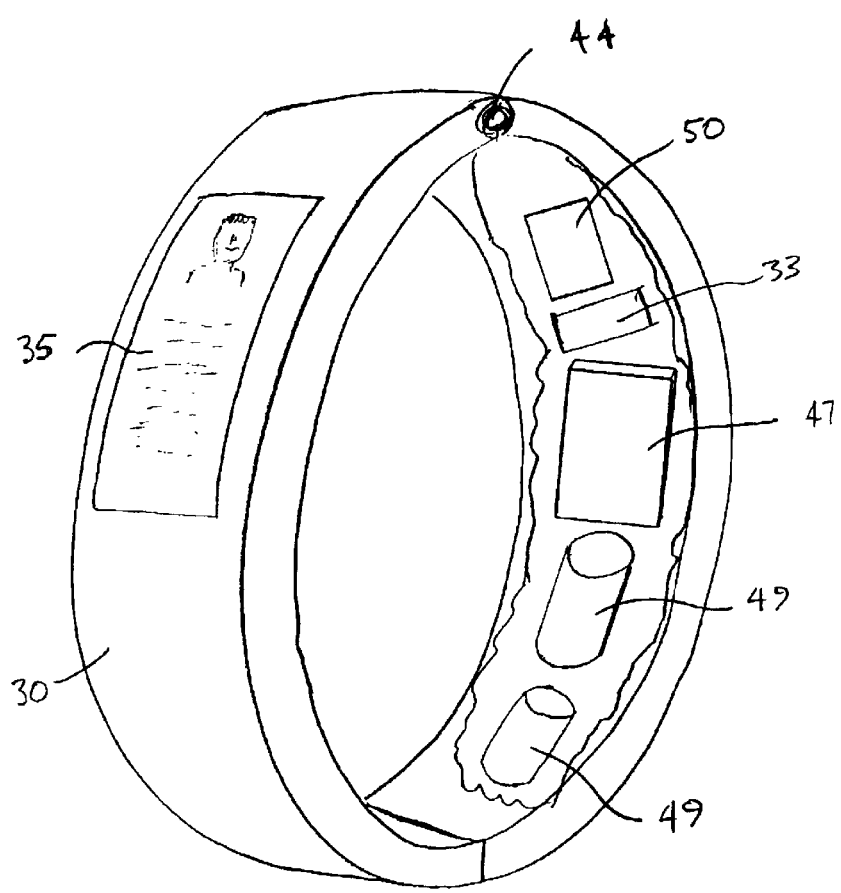
FIG 4

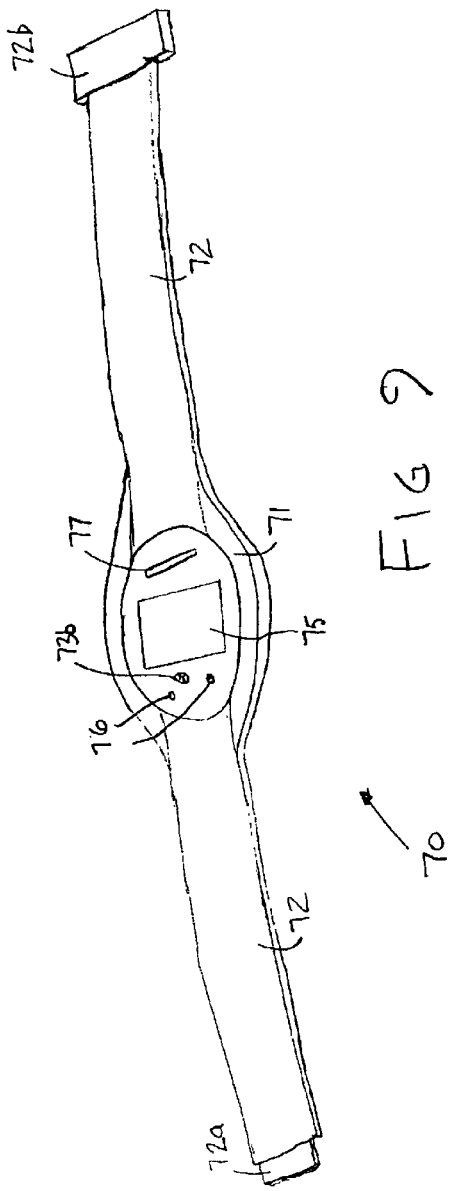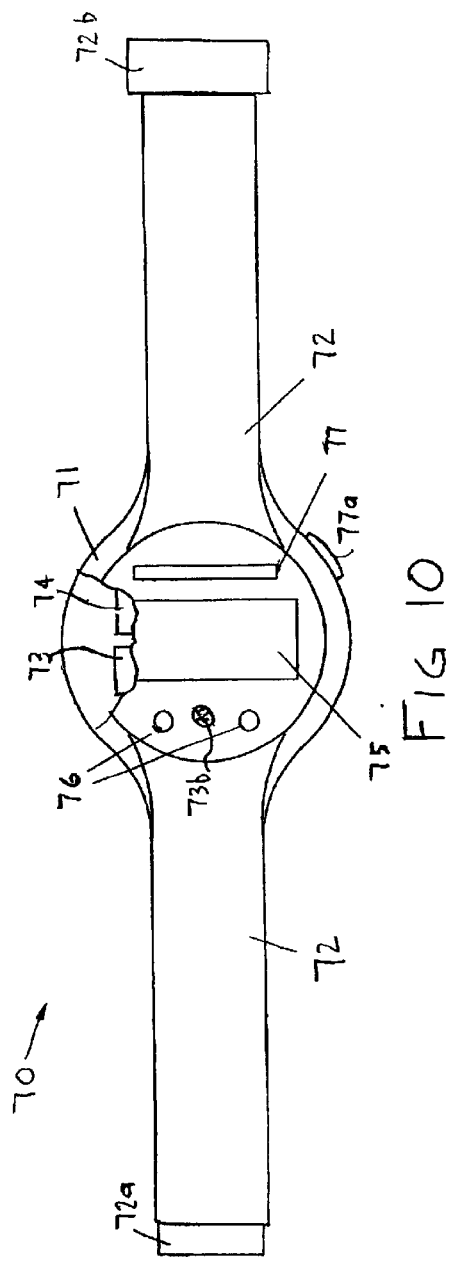

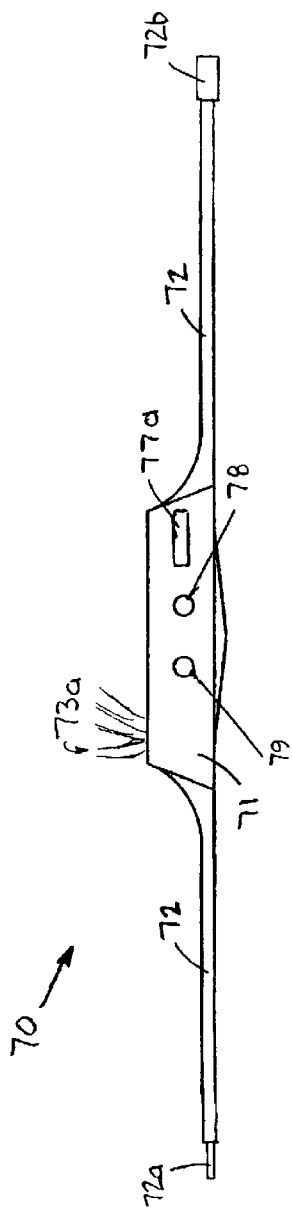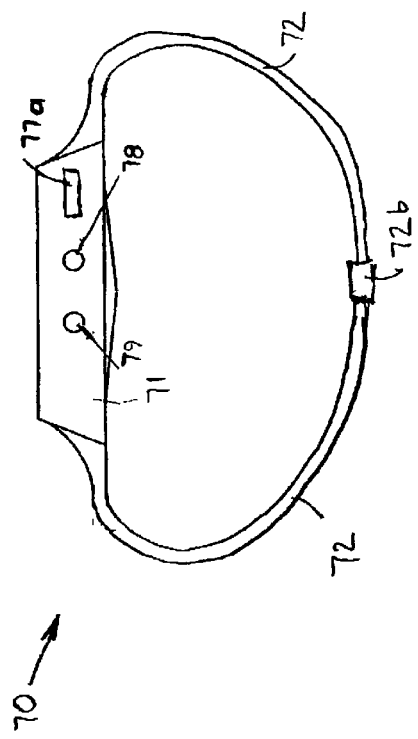

AIR TRAVEL SECURITY METHOD, SYSTEM AND DEVICE

This application is a provisional of No. 60/381,368, filed on May 20, 2002.

FIELD OF THE INVENTION

The present invention relates to air travel security methods, systems, and devices and more particularly to such air travel security methods, systems, and devices aimed at controlling terrorists, hijackers, and other unruly passengers on an aircraft.

BACKGROUND OF THE INVENTION

Recently, specifically since Sep. 11, 2001, security at major airports throughout the world has become a very serious concern. Security measures at such major airports have been increased very significantly, in many ways. Passengers are now checked much more thoroughly for identification and for weapons. There are also many more security personnel at major airports and also many more air marshals present on commercial flights. In spite of all the presently used tight security precautions, there is still no effective way to subdue a terrorist, a hijacker, or an unruly passenger. Even new "high-tech" biometric systems (e.g. iris scans, thumb prints, voice identification) might all fail in preventing a hijacker or terrorist from gaining entry to an aircraft.

Presently, air marshals are trained to use stun guns that employ Electro-Muscular-Disruption (EMD) technology such as a TASER manufactured by various manufacturers, for instance, TASER International Inc. of Scottsdale, Ariz., and Tasertron, a privately held manufacturer in Corona, Calif.

The TASER device uses compressed nitrogen to shoot two small probes up to about twenty feet or so. The projectile probes are connected to the TASER by insulated wire. When the probes make contact with the target, the air TASER transmits electrical pulses along the wires and into the body of the target through up to two inches of clothing. The result is an instant loss of the person's neuromuscular control and any ability to perform coordinated action. The effect of the device lasts anywhere from a few seconds to a few minutes.

Various airlines are starting to train their pilots to use stun guns in the event of a hijacking, or other terrorist activity, and the like.

Indeed, recent legislation has been passed in the United States that gives the Transportation Secretary, after a three-month study, permission to allow pilots to carry non-lethal weapons.

There are some significant problems associated with presently available TASERS. They have a maximum range of about twenty feet or so. Also it is necessary to physically contact the person with the two small projectile probes that are shot from the TASER unit, which may be very difficult. Further, a passenger can readily shield himself from the projectile probes.

It is an object of the present invention to provide an air travel security system having a primary purpose to "arrest" hi-jacker/terrorist on a plane who are acting in a threatening manner.

It is an object of the present invention to provide an air travel security system that has an effective range that covers an entire commercial airliner.

It is another object of the present invention to provide an air travel security system wherein physical contact with a selected passenger can readily be made.

It is yet another object of the present invention to provide an air travel security system wherein it is difficult for a passenger to shield himself from the unit.

SUMMARY OF THE INVENTION

In accordance with one aspect of the present invention there is disclosed a novel method of providing air travel security for passengers traveling via an aircraft, the method comprising the steps of: (a) permitting the passengers to board the aircraft for a flight thereon; (b) prior to the aircraft departing for the flight, situating a remotely activatable electric shock device on each of the passengers for the duration of the specified flight such that, for each passenger, the situated electric shock device is in position to deliver a disabling electrical shock to that passenger; (c) prior to the aircraft departing for the flight, arming the electric shock devices for subsequent selective activation of the electric shock devices by a remote source, wherein each activated electric shock device situated on a passenger, as aforesaid, is operable to deliver the disabling electrical shock to that passenger; (d) subsequent to the flight, removing the electric shock devices from the passengers; and, (e) permitting the passengers to disembark the aircraft.

In accordance with another aspect of the present invention there is disclosed a novel air travel security system for providing air travel security for passengers traveling via an aircraft. The air travel security system comprises a plurality of remotely activatable electric shock devices each having an armed state whereat the electric shock device produces, upon activation, a disabling electric shock. The remotely activatable electric shock devices are situatable one on each of the passengers for the duration of a flight on an aircraft such that, for each passenger, the situated electric shock device is in position to deliver the disabling electrical shock to that passenger. A selectively operable remote control means is disposed within the aircraft during the specified flight for producing an activating signal for activating the electric shock device, and transmitting the activating signal for receipt by the remotely activatable electric shock devices. The remotely activatable electric shock devices each have activation circuitry responsive to the activating signal transmitted from the selectively operable remote control means, which activation circuitry causes, upon receipt of the activating signal, the remotely activatable electric shock devices that are in their armed state to produce the disabling electric shock.

In accordance with yet another aspect of the present invention there is disclosed a novel remotely activatable electric shock device for providing security for passengers traveling via an aircraft. The remotely activatable electric shock device comprises a main body, and at least two electrodes protruding in skin contacting relation from the main body. There is also electronic circuitry for energizing the electrodes to thereby produce a disabling electric shock. Each of the electric shock devices has an armed state, whereat the electric shock device produces, upon activation, a disabling electric shock. The remotely activatable electric shock devices are situatable one on each of the passengers for the duration of a specified flight on an aircraft such that, for each passenger, the situated electric shock device is in position to deliver the disabling electrical shock to that passenger. The remotely activatable electric shock devices each have activation circuitry responsive to an activating signal transmitted from a selectively operable remote control means, which activation circuitry, upon receipt of the activating signal, causes the remotely activatable electric shock devices that are in their armed state to produce the disabling electric shock.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

BRIEF DESCRIPTION OF THE DRAWINGS

The novel features which are believed to be characteristic of the method, system and device for providing air travel security for passengers traveling via an aircraft according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings:

FIG. 3 is a elevational view of a first preferred embodiment of the air travel security system according to the present invention showing a remotely activatable electric shock device in the form of a bracelet worn on a person's arm, specifically on the wrist;

FIG. 3A is a elevational view similar to FIG. 3, but with the alarm sounding;

FIG. 4 is an enlarged elevational view of the bracelet of FIG. 1, partly cut-away, with the bracelet in a closed in use configuration;

FIG. 9 is a perspective view of an seventh preferred embodiment remotely activatable electric shock device of the air travel security system according to the present invention;

FIG. 10 is a top plan view of the seventh preferred embodiment remotely activatable electric shock device of FIG. 9;

FIG. 11 is a side elevational view of the seventh preferred embodiment remotely activatable electric shock device of FIG. 9, with the strap means closed;

FIG. 12 is a side elevational view of the seventh preferred embodiment remotely activatable electric shock device of FIG. 9, with the strap means opened;

DETAILED DESCRIPTION OF A PREFERRED EMBODIMENT

Figure 1:
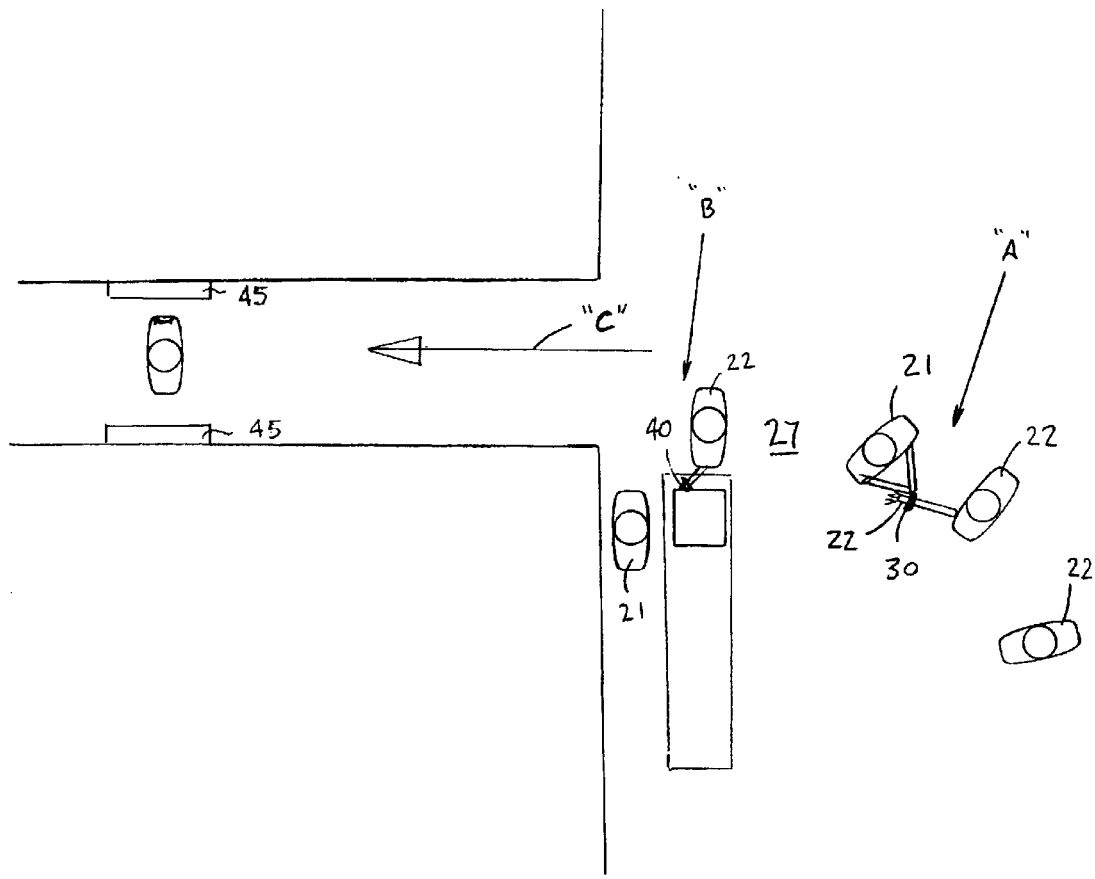
FIG. 1 is a simplified top plan view of the passenger boarding area of a typical major airport.

Referring to FIGS. 1 through 12 of the drawings, it will be noted that FIGS. 1 through 7A and FIG. 8 illustrate the first preferred embodiment of the air travel security system 20 according to the present invention; FIG. 7B illustrates the second preferred embodiment of the air travel security system 20 according to the present invention; FIG. 7C illustrates the third preferred embodiment of the air travel security system 20 according to the present invention; FIG. 7D illustrates the fourth preferred embodiment of the air travel security system 20 according to the present invention; FIG. 7E illustrates the fifth preferred embodiment of the air travel security system 20 according to the present invention; FIG. 7F illustrates the sixth preferred embodiment of the air travel security system 20 according to the present invention; FIG. 9 illustrates the seventh preferred embodiment of the air travel security system 20 according to the present invention; FIG. 10 illustrates the eighth preferred embodiment of the air travel security system 20 according to the present invention; FIG. 11 illustrates the ninth preferred embodiment of the air travel security system 20 according to the present invention; and FIG. 12 illustrates the ninth preferred embodiment of the air travel security system 20 according to the present invention.

Reference will now be made to FIGS. 1 through 7A and FIG. 8, which show the first preferred embodiment of the air travel security system 20 according to the present invention. The air travel security system 20 is for providing air travel security for passengers 22 traveling via an aircraft 26. The aircraft 26 would typically be a large commercial aircraft 26, such as those typically operated by major airlines, and could also be a smaller type of aircraft 26 used for commercial purposes. Further, the present invention is usable on military aircraft, and would be extremely desirable on aircraft 26 used to transport prisoners of war and terrorists. The present invention is usable on aircraft used by law enforcement agencies to transport criminals, and so on. Essentially, the present invention applies to virtually any type of aircraft 26 where passengers 22 are carried; however, there would generally be very little applicability of the present invention in private aviation.

The air travel security system 20 comprises a plurality of remotely activatable electric shock devices 30. These remotely activatable electric shock device 30 are for providing security for passengers 22 traveling via an aircraft 26. In the first preferred embodiment, as shown in FIGS. 1 through 7A and FIG. 8, the remotely activatable electric shock device 30 comprises a main body in the form of a bracelet 40, as can be best seen in FIGS. 3 through 6. The bracelet 40 that is worn on a person's arm, specifically at the person's wrist 23. The bracelet 40 could also be worn on a passenger's ankle.

Preferably, the bracelet 40 exteriorly is colour coded in order to permit authorized personnel to be able to visually identify the airline and flight number of the passenger's flight. The colour coding could be changed either periodically or for each occurrence of the same flight number flight, as desired. Frequent changes in colour coding would make it more difficult for a passenger 22 to wear a fake bracelet 40 that matched the bracelet 40 designated for a particular flight, and therefore would help permit the flight crew to more readily identify a passenger 22 who is wearing a fake bracelet.

Optionally, as seen in FIG. 4, the bracelet 40 may have a disposable paper or plastic cover 31 surrounding it so as to ensure that only clean material contacts the passenger's skin.

Figure 2:
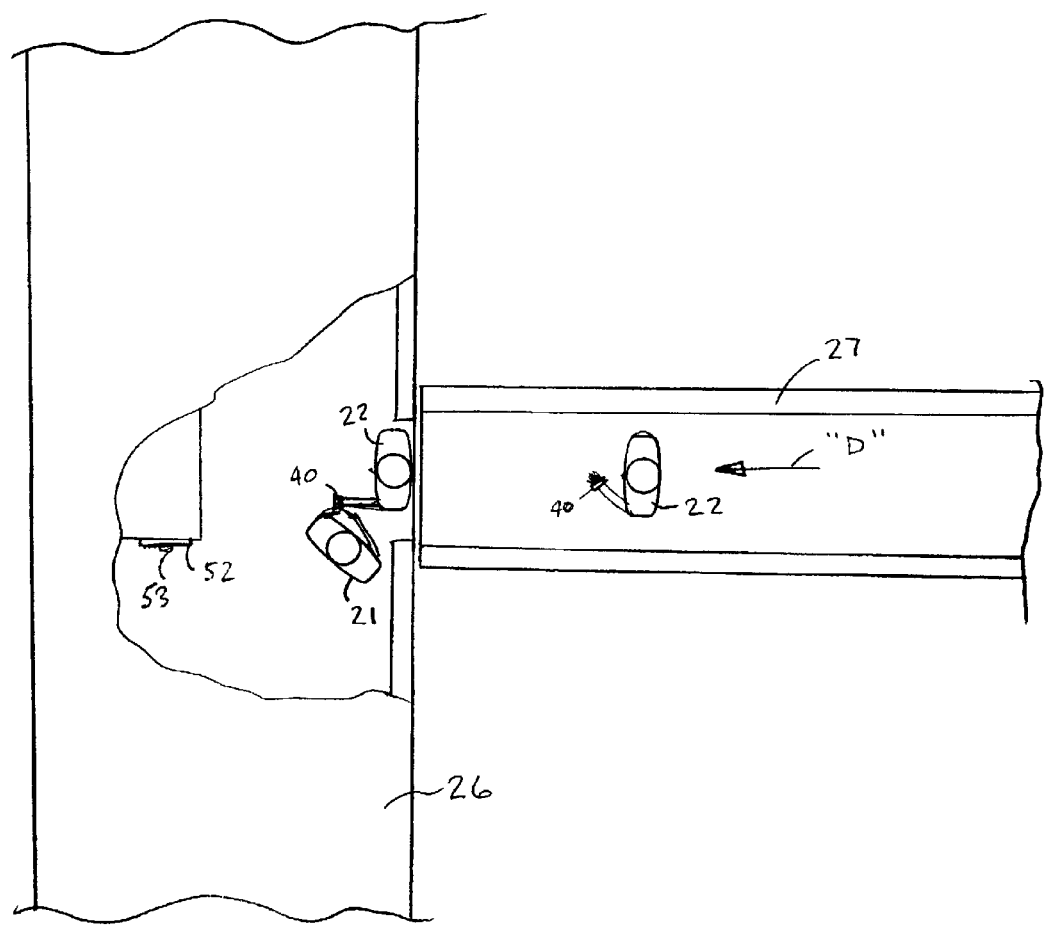
FIG. 2 is a simplified top plan view of the elevated walkway from the passenger boarding area shown in FIG. 1, to an commercial aircraft.
Figure 5:
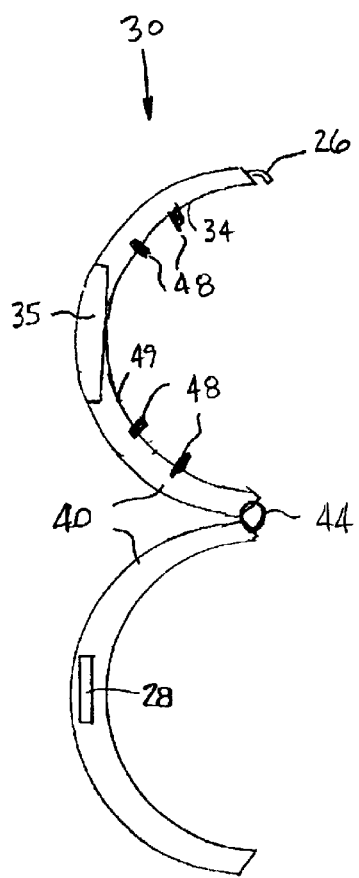
FIG. 5 is a view showing the bracelet shown in FIG. 4 in an opened position, before it is situated onto a person's arm.
Figure 6:
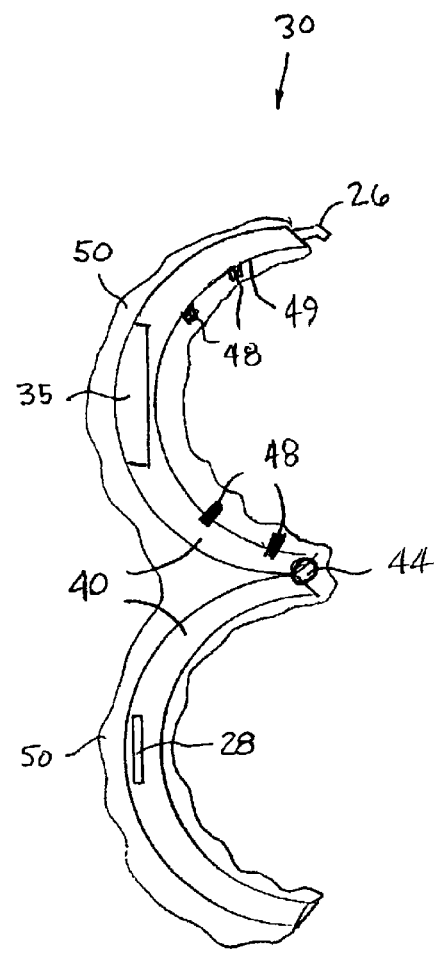
FIG. 6 is a view similar to FIG. 5, but with an optional disposable protective plastic or paper tube placed over the bracelet.

Each bracelet 40 is movable between a closed in-use configuration, as can be best seen in FIGS. 4 and 2, and an opened situating configuration, as can be best seen in FIGS. 3 and 5.

The bracelet 40 is preferably has a hinge 44 disposed across its width so as to permit opening of the bracelet 40, and has a securing mechanism 46 disposed oppositely to the hinge 44 to permit the bracelet 40 to be removably secured onto a person's arm. The securing mechanism 46 may optionally have a lock (not shown), with keys to the lock in the possession of flight attendants, the pilot, the co-pilot, air marshals, and other authorized personnel.

In the opened situating configuration, as can be best seen in FIG. 3, the bracelet 40 is placeable over a passenger's wrist 23, so as to situate the remotely activatable electric shock device 30 on a passenger 22, in position to deliver a disabling electrical shock to that passenger 22. In the closed in-use configuration, as can be best seen in FIG. 2, the bracelet 40 is situated in secured relation on a passenger's wrist 23, so as to remain in place for the duration of the flight. Further, the bracelet 40 may be adjustable in size in its closed in-use configuration, so as to permit various sizes of wrists to be accommodated.

It should be understood that a passenger 22 who might wish to hijack or otherwise overtake an aircraft 26, will try to remove the remotely activatable electric shock device 30 from his wrist 23, so that a disabling electrical shock cannot be delivered to that passenger 22. Also, it is possible that the securing mechanism 46 on any electric shock device 30 could inadvertently release. In any event, in order to alert the crew of the aircraft 26 of possible release or removal of a remotely activatable electric shock devices 30 from a passenger 22, each of the remotely activatable electric shock devices 30 comprises alarm circuitry 50. The alarm circuitry 50 produces an audible alarm, as indicated by general reference numeral 51 in FIG. 3A, if the bracelet 40 is removed from its closed in-use configuration, but only when the electric shock device 30 is in the armed configuration. Such removal would include being moved from its closed in-use configuration to its open situating configuration, and also would include being cut or broken apart, being tampered with. Further, the alarm could sound if an electric shock device 30 has low power, or is malfunctioning. Also Alternatively, or additionally, the alarm circuitry 50 may transmit an alarm via a radio frequency carrier signal to a co-operating receiver in the aircraft 26. The receiver could audibly and visually alert members of the crew that an electric shock device 30 had been removed. Such an alarm transmitted via a radio frequency carrier, for instance, could carry digital information related to the identity of the passenger 22, thus allowing the crew to determine which seat the passenger 22 is sitting in.

There are at least two electrodes 48 included as part of each remotely activatable electric shock device 30. In the first preferred embodiment, there are four electrodes 48, for the sake of redundancy. As is well known in the art of electronics, there must be at lest one positive electrode and one negative electrode. The electrodes 48 protrude in skin contacting relation from the inner surface 49 of the bracelet 40, so as to contact, or nearly contact, the passenger's skin. Preferably, when the bracelet 40 is worn on a passenger's wrist 23, the electrodes 48 are in electrically conductive contact with the passenger's skin; however, due to the high voltage produced by the electric shock device 30, the electrodes 48 can deliver a disabling electric shock from a distance of up to about five centimeters. A disabling electric shock, as described above, reaches the body of the passenger 22 on which the electric shock device 30 is situated, thus resulting in an instant loss of the person's neural-muscular control.

There is electronic circuitry 47 for energizing the electrodes 48, to thereby produce a disabling electric shock. The electronic circuitry 47 includes at least one capacitor 49, and in the various preferred embodiments, a plurality of capacitors 49 for the sake of redundancy. In the first preferred embodiment, and in the other preferred embodiments discussed, the electronic circuitry 47 of each of the electric shock devices 30 comprises electro-muscular-disruption technology circuitry. Essentially, electro-muscular-disruption technology circuitry produces a potential across the electrodes 48 of about 30,000 volts to about 50,000 volts, but only a few milliamps of current, so as to be safe to humans.

Each remotely activatable electric shock device 30 has an armed configuration and an unarmed configuration. In the armed configuration, the electric shock device 30 produces, upon subsequent activation (discussed in detail subsequently), a disabling electric shock, and more specifically an electro-muscular-disruptive electric shock. As can be best seen in FIG. 2, the bracelet 40 would preferably have a readily visible light emitting diode (LED) 41 of one colour to indicate that the bracelet 40 is in an unarmed state, but still operational, or in other words turned on, and a readily visibly light emitting diode (LED) 42 of another colour to indicate that the bracelet 40 is in an armed state.

In the unarmed configuration, the electric shock device 30 is precluded from producing the disabling electric shock upon receipt of the activating signal, thus precluding the passenger 22 wearing the electric shock device 30 from receiving a disabling electric shock.

The remotely activatable electric shock devices 30 are situatable one on each of the passengers 22 for the duration of a flight on the aircraft 26. Further, the electric shock devices 30 are situatable such that, for each passenger 22, the situated electric shock device 30 is in position to deliver a disabling electrical shock to that passenger 22.

There is a selectively operable remote control means 52 for producing an activating signal for activating the electric shock device 30. The selectively operable remote control means 52 also transmits the activating signal for receipt by the remotely activatable electric shock devices 30 on the aircraft 26.

Figure 7A:
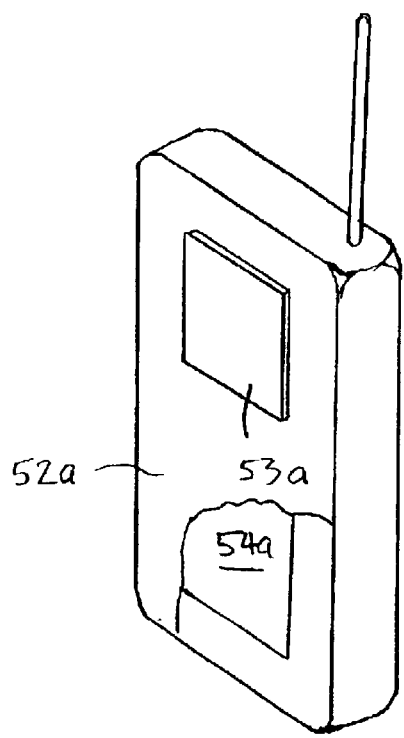
FIG. 7A is a perspective view of a transmitter according to the first preferred embodiment of the air travel security system according to the present invention.
Figure 8:
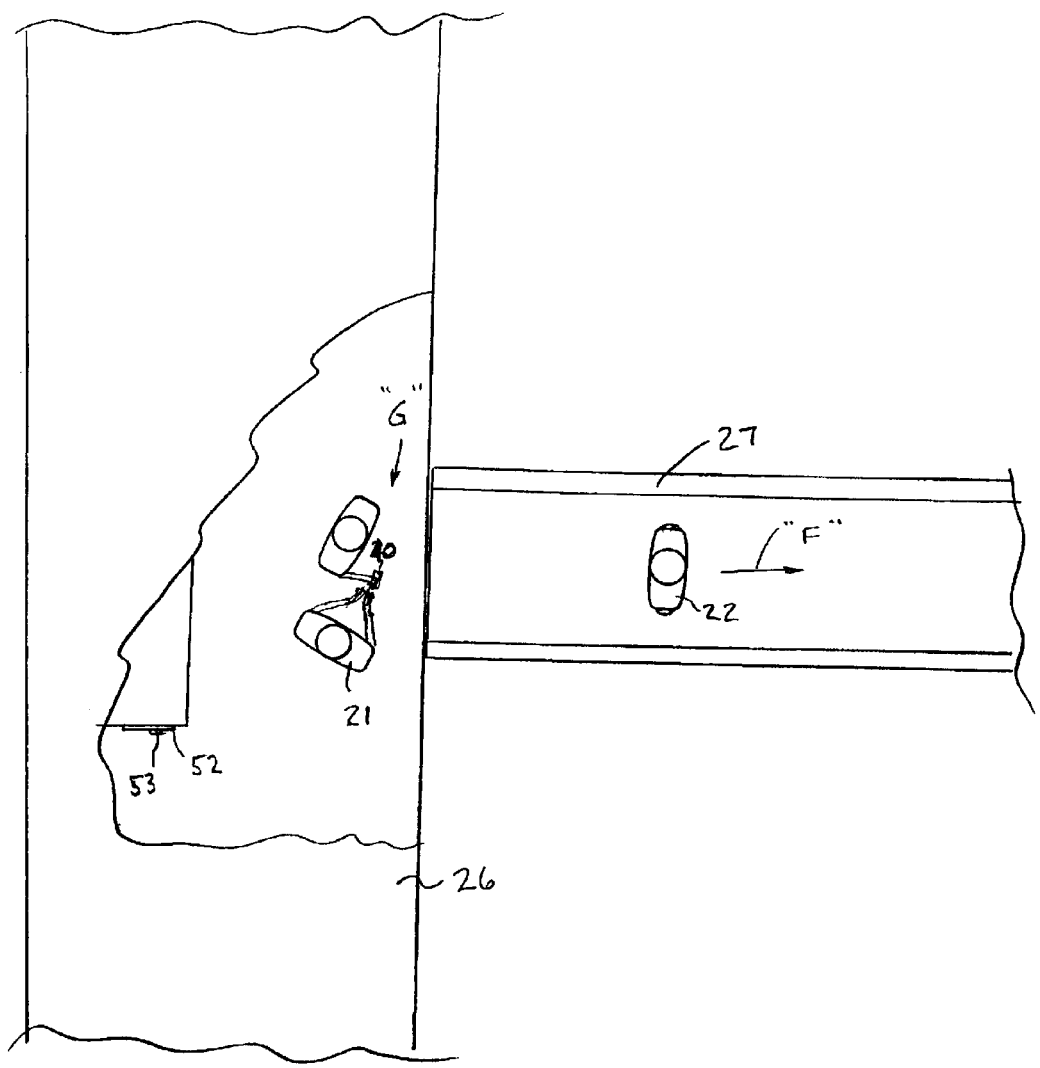
FIG. 8 is a simplified top plan view similar to FIG. 1, but showing passengers disembarking the commercial aircraft.

The selectively operable remote control means 52 comprises an electronic circuit disposed within the aircraft 26 during the flight. The electronic circuit may be built in to the aircraft 26, as can be seen in FIGS. 2 and 8, and have activation switches 53 in the form of pushbuttons, handles, keys, or the like, disposed at various locations throughout the aircraft 26. Preferably, the activation switches are accessible by authorized personnel only so as to preclude unwanted activation of the remotely activatable electric shock devices 30 on the aircraft 26. The electronic circuit may alternatively or additionally comprise one or more portable battery powered units 52a, as shown in FIG. 7A. Each of these portable battery powered units 52a is carried by an authorized personnel on the aircraft 26. In this manner, there is carefully restricted access to the selectively operable remote control means 52 that controls the remotely activatable electric shock devices 30, thus minimizing the chance of the electric shock devices 30 being activated by unauthorized personnel.

The remotely activatable electric shock devices 30 each have activation circuitry 33 responsive to the activating signal transmitted from the selectively operable remote control means 52, which activation circuitry 33 causes, upon receipt of the activating signal, the remotely activatable electric shock devices 30 that are in their armed configuration to produce the disabling electric shock. In the various preferred embodiments, each of the electric shock devices 30 preferably comprises electro-muscular-disruption technology circuitry, as discussed above.

In the first preferred embodiment, the selectively operable remote control means 52a is operable by switch 53a and includes radio frequency transmitter circuitry 54a that transmits a low power short range radio frequency carrier signal for receipt by the activation circuitry 33 of the remotely activatable electric shock devices 30. The activating signal may be of any suitable an permissible frequency, that does not interfere with the various avionics and radios of the aircraft 26, and may be either an AM (amplitude modulation) or FM (frequency modulation) carrier signal. Correspondingly, the activation circuitry 33 is responsive to a radio frequency carrier signal.

The advantage of using a radio frequency carrier to activate the electric shock device 30 includes a significant transmission range and the ability to pass through material such as clothing. One drawback is that a radio frequency carrier is substantially omni-directional in nature, thus making it difficult to activate the electric shock device 30 of a selected passenger 22.

Figure 7B:
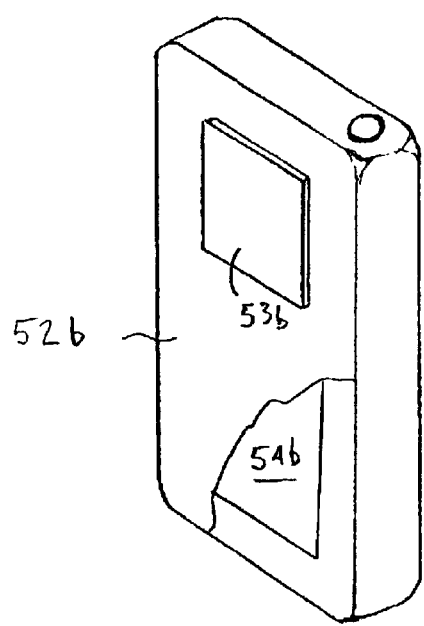
FIG. 7B is a perspective view of a transmitter according to a second preferred embodiment of the air travel security system according to the present invention.

In a second preferred embodiment, as illustrated in FIG. 7B, the selectively operable remote control means 52b is operable by switch 53b and includes ultrasonic transmitter circuitry 54b and the activating signal comprises an ultrasonic carrier signal transmitted by the ultrasonic transmitter circuitry 54b. Correspondingly, the activation circuitry 33 is responsive to an ultrasonic carrier signal. The advantage of using an ultrasonic carrier to activate the electric shock device 30 includes a significant transmission range and the ability to pass through material such as clothing. Also, an ultrasonic carrier signal would not interfere with the various avionics and radios of the aircraft 26. One drawback is that ultrasonic carrier signal is substantially omni-directional in nature, thus making it difficult to activate the electric shock device 30 of a selected passenger 22.

Figure 7C:
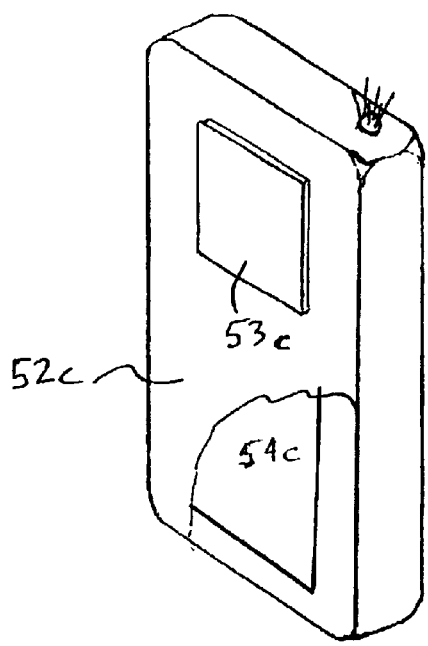
FIG. 7C is a perspective view of a transmitter according to a third preferred embodiment of the air travel security system according to the present invention.

In a third preferred embodiment, as illustrated in FIG. 7C, the selectively operable remote control means 52c is operable by switch 53c and includes infra-red light transmitter circuitry 54b and the activating signal comprises an infra-red light carrier signal transmitted by the infra-red light transmitter circuitry 54d. Correspondingly, the activation circuitry 33 is responsive to an infra-red light carrier signal. An infra-red light carrier signal also has a significant transmission range, but generally cannot pass through material such as clothing. However, an infra-red light carrier signal can be directed quite narrowly, thus making it readily possible to activate the electric shock device 30 of a selected passenger 22.

Figure 7D:
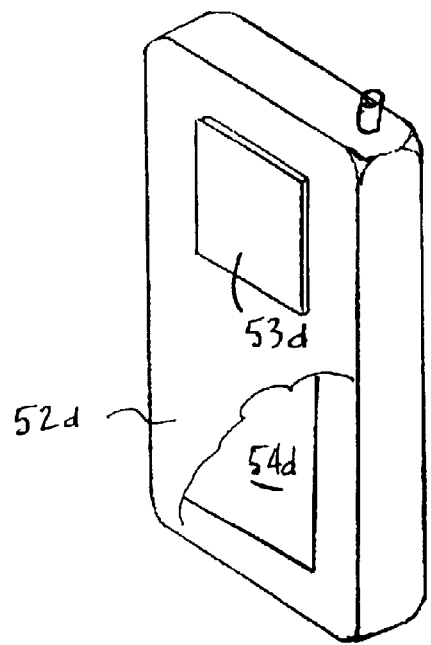
FIG. 7D is a perspective view of a transmitter according to a fourth preferred embodiment of the air travel security system according to the present invention.

In a fourth preferred embodiment, as illustrated in FIG. 7D, the selectively operable remote control means 52d is operable by switch 53d and includes laser light transmitter circuitry 54d and the activating signal comprises a laser light carrier signal transmitted by the laser light transmitter circuitry 54d. Correspondingly, the activation circuitry 33 is responsive to a laser light carrier signal. A LASER light carrier signal has a very significant transmission range, but generally cannot pass through material such as clothing. However, a LASER light carrier signal can be directed quite narrowly, thus making it readily possible to activate the electric shock device 30 of a selected passenger 22.

Figure 7E:
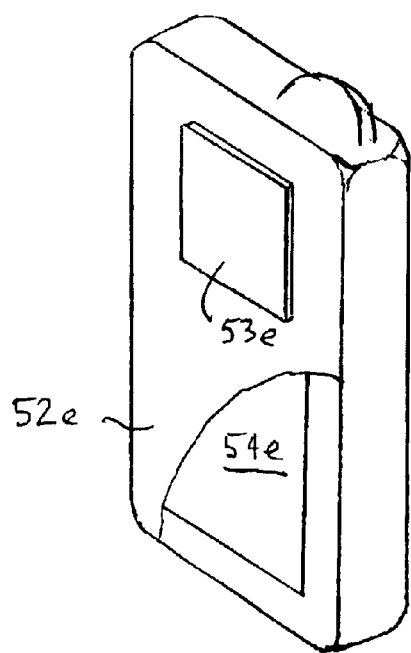
FIG. 7E is a perspective view of a transmitter according to a fifth preferred embodiment of the air travel security system according to the present invention.
Figure 7F:
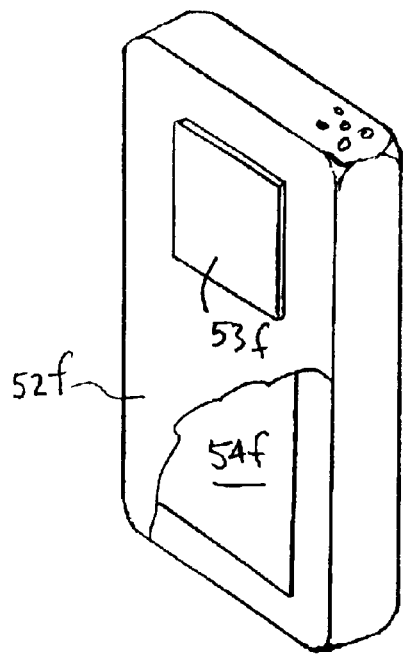
FIG. 7F is a perspective view of a transmitter according to a sixth preferred embodiment of the air travel security system according to the present invention.

In a fifth preferred embodiment, as illustrated in FIG. 7E, the selectively operable remote control means 52e is operable by switch 53e and includes magnetic field transmitter circuitry 54e and the activating signal comprises a magnetic field carrier signal transmitted by the magnetic field transmitter circuitry 54e. Correspondingly, the activation circuitry 33 is responsive to a magnetic field carrier signal. The use of a magnetic field to activate an electric shock device 30 on a selected person has a potential drawback in that the magnet would have a limited range of effectiveness; however, this limited range of effectiveness can also be advantageous in that only the electric shock device 30 on the selected person would be activated. Other electric shock devices 30 more than a couple of feet away would not be activated.

In a sixth preferred embodiment, as illustrated in FIG. 7D, the selectively operable remote control means 52f is operable by switch 53f and includes microwave transmitter circuitry 54f and the activating signal comprises a microwave carrier signal transmitted by the microwave transmitter circuitry 54f. Correspondingly, the activation circuitry 33 is responsive to a microwave carrier signal. Such a microwave carrier signal would need to be low power and at a frequency that would minimizes any harm to passengers 22. One drawback is that the microwave carrier signal would be substantially omni-directional in nature, thus making it difficult to activate the electric shock device 30 of a selected passenger 22.

It is possible to combine two or more types of transmission media into one remote control. For instance, it might be desirable to have an infra-red light carrier and a radio frequency carrier (independently actuatable) included in one remote control. This would permit initial attempt at activating the electric shock device 30 on the selected passenger 22 only via the infra-red light carrier. If this initial attempt did not work, which might be the case if the selected passenger 22 has physically covered the electric shock device 30, a second attempt at activating the electric shock device 30 can be made via the radio frequency carrier. This second attempt might unfortunately activate several electric shock devices 30, but at least an initial attempt at activating the electric shock device 30 on the selected passenger 22 can be made.

As can be best seen in FIG. 2, the bracelet 40 includes digital electronic circuitry 28 that contains digital information pertaining to the identity of the passenger 22 who has the bracelet 40 situated thereon. This information could include the passenger's name, address, ticket information (especially the flight number) boarding pass, and a digital photograph of the passenger 22. There is also a display screen 35 for displaying the digital information. The bracelet 40 with this electronic information, eliminates the need for the passenger 22 to carry a ticket, and also precludes the chance of the passenger 22 losing the ticket or having the ticket stolen. A bracelet 40 can also include other types of electronic circuitry, such as GPS circuitry to track a passenger's location. Further, the information in the bracelet 40 could concur with information stored on an electronic circuit attached to the person's luggage, both "carry on" luggage and "checked in" luggage. Further, the information in the bracelet 40 could be transmitted at various check points so as to be received by a computer system 20, and the information verified.

The electronic circuitry 28 also contains information about the flight that the passenger 22 is boarding. Each flight of an aircraft (defined as a takeoff and landing) is assigned a unique flight code that is entered into each bracelet 40. The flight code preferably comprises both letters and numbers and is preferably several digits long. Also, it may be related to the date of the flight and the cities that it departs from and arrives in. It may also be randomly generated to make it impossible for another party to predict the flight code.

The flight code is transmitted from the bracelet 40 to a receiving unit (also referred to as a scanner) as each passenger 22 is boarding the aircraft 26. The flight code within the bracelet 40 must match the flight code of that particular flight in order for the passenger to be able to board the flight. In other words, each passenger boarding the flight must have a legitimate electric shock device 30 in order to board the flight. This prevents a would-be terrorist or hijacker from obtaining an electric shock device 30, disabling its functionality, and then wearing it onto an aircraft, thus being protected from receiving a shock from the electric shock device 30.

The present invention also encompasses a method of providing air travel security for passengers 22 traveling via an aircraft 26. As discussed above, the present invention applies to virtually any type of aircraft 26 where passengers 22 are carried. The method comprises the steps of first registering passengers 22 for boarding the aircraft 26. Typically the passengers 22 would have to show identification including a photograph, when registering, for security purposes.

Once a passenger 22 has been registered, he or she is subsequently permitted to board the aircraft 26 for a flight thereon. Typically, passengers 22 who are to board a flight are received into a flight boarding area 27. As the passengers 22 leave the flight boarding area, the identity of the passengers 22 boarding the flight is verified. With the present invention, if the flight number and a digital photograph are stored in the electric shock device 30, and the electric shock device 30 has a display screen 35, or through use of a display screen temporarily coupled in operative relation thereto, the identity of each passenger 22 boarding the flight can be checked using the electric shock device 30. Such checking of identification can be done when leaving the waiting area and/or when actually entering the aircraft 26, or actually any time prior to the aircraft 26 departing for the flight.

Prior to the aircraft 26 departing for the flight, the remotely activatable electric shock devices 30 are situated in secured relation on each of the passengers 22, typically one electric shock device 30 per passenger 22. The electric shock devices 30 are situated in the aforesaid secured relation on each of the passengers 22 for the duration of the flight, such that said selectively activatable electric shock devices 30 cannot readily be removed by unauthorized personnel. Depending on regulations or on airline policies, the electric shock devices 30 may be situated only on passengers 22 who are over a specified age and/or who are over a specified size (height and/or weight).

The electronic shock devices 30 could be situated on passengers 22 at registration; however, this would mean that the electronic shock devices 30 would be on the passengers 22 for potentially a very long time, especially if a flight is delayed. In the first preferred embodiment, the electronic shock devices 30 are situated on passengers 22 just before boarding the aircraft 26, as indicated by arrow "A" in FIG. 1.

The electric shock devices 30 are situated such that, for each passenger 22, the situated electric shock device 30 is in position to deliver a disabling muscular-disruptive electrical shock to that passenger 22. The preferred location is on a passenger's wrist 23, since this location is easily accessible and is generally inoffensive to most people. Most importantly, an electric shock device 30 situated thusly is difficult to remove.

Once an electric shock device 30 is situated on a passenger 22, the alarm circuitry 50 on the electric shock devices 30 can be enabled. The alarm circuitry 50 produces an alarm if the electric shock device 30 is removed from the passenger 22, when the electric shock device 30 is in the armed configuration.

It is preferable, and indeed very useful, once an electric shock device 30 has been situated on a passenger 22, to verify the operability of the electric shock device 30 to be able to deliver a disabling electrical shock to that passenger 22. This can be accomplished by means of test circuitry that checks that the capacitors of the electric shock device 30 are fully charged. Further, the test circuitry causes a small electric charge of perhaps a few volts to be delivered across the electrodes 48. A high resistance resistor disposed in electrically conductive relation across the electrodes 48 a small current flow that could be measured and reported.

Once the electric shock device 30 is situated on the passenger 22 and prior to the aircraft 26 departing for the flight, information pertaining to the identity of that passenger 22, such as their name, address, flight number, a digital photograph, and so on, can be entered into the electronic shock device 30, as indicated by arrow "B" in FIG. 1.

After the electronic shock device 30 has been situated on a passenger 22, as can be seen in FIG. 1, as the passenger 22 continues toward the aircraft 26, as indicated by arrow "C", a passenger's bracelet 40 can be scanned by a scanning system 45 (at security points), thus precluding the need to manually have a person's ticket checked, thus facilitating the quick passage of passengers 22 from one area to the next. Further, scanners could be included in the seats of the aircraft 26 to ensure that each registered passenger 22 is on the aircraft 26 and in his/her proper seat before the aircraft departs.

The passengers 22 continue along an elevated walkway 27, as indicate by arrow "D" in FIG. 2, and then board the aircraft 26, as indicated by arrow "C" in FIG. 2.

Prior to the aircraft 26 departing for the flight, the electric shock devices 30 are armed for subsequent selective activation of the electric shock devices 30 by the selectively operable remote control means 52. As such, each activated electric shock device 30 situated on a passenger 22, as aforesaid, is operable to deliver the disabling electrical shock to that passenger 22. The electric shock devices 30 may be armed manually by authorized personnel 21, when the electric shock devices 30 are situated on the passengers 22, prior to boarding the flight on the aircraft 26. Alternatively, as indicated by arrow "E" in FIG. 2, electric shock devices 30 may be armed manually by authorized personnel 21 when boarding the aircraft. Alternatively, the electric shock devices 30 may be armed automatically when the electric shock devices 30 are situated on the passengers 22, or may be armed automatically when each passenger 22 boards the aircraft 26, upon receipt of an arming signal. Another alternative method would be to arm all of the electric shock devices 30 concurrently when the passengers 22 on the aircraft 26 are seated, just prior to the flight departing. Such concurrent arming could occur on receipt of an arming signal.

If the electric shock devices 30 are switched into their armed and unarmed configurations remotely, the arming and disarming may be carried out by means of by means of radio frequency carrier or an ultrasonic carrier, an infra-red light carrier, a LASER light carrier, by a microwave carrier, or even by way of a magnetic field, as discussed previously.

Preferably, the means for activating the electric shock device 30 is different than the means by which the bracelet 40 is switched between its unarmed state and its armed state, in order to minimize the chance of false activation of the electric shock device 30.

Upon activation of the electric shock device 30, through receipt of an activating signal from the selectively operable remote control means 52, the passenger 22 wearing that particular bracelet 40 receives the disabling electrical shock from the electric shock device 30. Accordingly, the passenger 22 becomes incapacitated for a few seconds or perhaps a few minutes, during which time the passenger 22 can be fully subdued and handcuffed, if necessary. Depending on the type of transmission medium used to send the activating signal, other passengers 22 may also become temporarily incapacitated, which is undesirable and unfortunate, but may be unavoidable.

Subsequent to the flight, or in the event the flight is cancelled, the passengers 22 are permitted to disembark the aircraft 26, as indicated by arrow "F" in FIG. 8. The electric shock devices 30 are removed from the passengers 22 either as they disembark the aircraft 26, as indicated by arrow "G" in FIG. 8, or subsequently in a waiting area. The electric shock devices 30 are disarmed either automatically while the passengers 22 on the aircraft 26 are still seated after landing. Such concurrent disarming could occur on receipt of a disarming arming signal. The electric shock devices 30 could also be disarmed, either manually or automatically, as the passengers 22 disembark the aircraft 26. Alternatively, such disarming could occur automatically when each electric shock device 30 is removed from the passenger 22 it has been situated on.

Once passengers 22 disembark the airplane and the bracelets 40 have been removed from the passengers 22, the bracelet 40 are surrendered to the flight crew or security personnel. The bracelet 40 are reusable, and may be programmed specifically for each airline carrier or may be generic.

In a seventh preferred embodiment, as illustrated in FIGS. 9 through 12, each of the remotely activatable electric shock devices 70 comprises a main body 71 and a strap means 72 secured to the main body 71. Each strap means 72 is movable between a closed in-use configuration and an open situating configuration. The strap means 72 is kept in its closed in-use configuration by a locking clasp having a male portion 72a and a female portion 72b.

For security purposes, each of the seventh preferred embodiment remotely activatable electric shock devices 70 comprises alarm circuitry 73. The alarm circuitry 73 is used to alert the crew of the aircraft 26 of possible release or removal of a remotely activatable electric shock devices 70 from a passenger 22, or in other words, if the strap means 72 is moved to its open situating configuration. The alarm circuitry 73 produces an audible alarm, as indicated by general reference numeral 73a (shown in FIG. 11) from a speaker 73b, if the strap means 72 is removed from its closed in-use configuration, but only when the electric shock device 70 is in the armed configuration. Alternatively, or additionally, the alarm circuitry 73 may transmit an alarm via a radio frequency carrier signal to a co-operating receiver (not shown) in the aircraft 26. The receiver could audibly and visually alert members of the crew that an electric shock device 70 had been removed. Such an alarm transmitted via a radio frequency carrier, for instance, could carry digital information related to the identity of the passenger 22, thus allowing the crew to determine which seat the passenger 22 is sitting in.

The remotely activatable electric shock device 70 also includes digital electronic circuitry 74 that contains digital information pertaining to the identity of the passenger 22 who has the electric shock device 70 situated thereon, and for storing flight code information.

The remotely activatable electric shock devices 70 also comprise a display screen 75 located on the face of the main body 71, for displaying the digital information, and a pair of status light emitting diodes 76. An infra-red data port 77 is also located on the face of the main body 71. The infra-red data port 77 transmits the digital information pertaining to the identity of the passenger 22 and the flight code to a scanner (not shown) operated by authorized personnel. A push-button switch 77a located on the side of the main body 71 is used to initiate transmission of information from the infra-red data port 77. A bi-directional data port 78 is used to transfer digital information pertaining to the identity of the passenger 22 and the flight code to and from the electric shock device 70. A power jack 79 located on the side of the main body 71 is used to recharge the electric shock devices 70.

It should be understood that although it is highly preferable that a passenger 22 be unable to remove the electric shock device 30 without assistance from the flight crew, security personnel, or flight marshal, some passengers 22 might strongly object to wearing a bracelet 40, especially on a lengthy trip.

Figure 13:
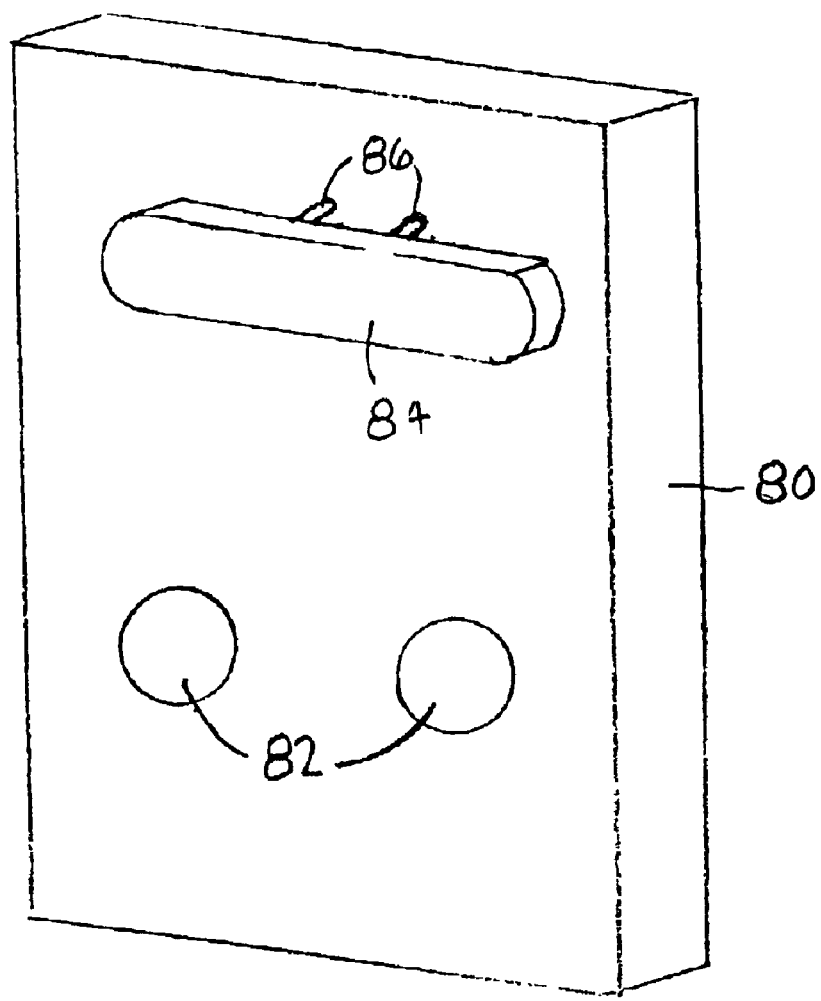
FIG. 13 is a perspective view of an eighth preferred embodiment remotely activatable electric shock device according to the present invention.

Accordingly, in an eighth preferred embodiment of the present invention, as shown in FIG. 13, the remotely activatable electric shock device 80 is small and substantially flat in shape, and is dimensioned to be worn in a shirt pocket or the like. The two electrodes 82 would face the passenger 22. In order to preclude the removal of the remotely activatable electric shock device 80 from a pocket once it has been activated, a small clasp 84 could be frictionally secured to one or more posts 86 projecting outwardly from the remotely activatable electric shock device 80. Preferably, the posts 84 could extend through the material of the pocket or through a button hole in order to make it necessary to remove the clasp 84 from the posts 86 in order to remove the remotely activatable electric shock device 80 from ones pocket. The clasp 84 could be electrically conductive and removal of the clasp 84 from the posts 86 could trigger an alarm circuit in the remotely activatable electric shock device 80.

Figure 14:
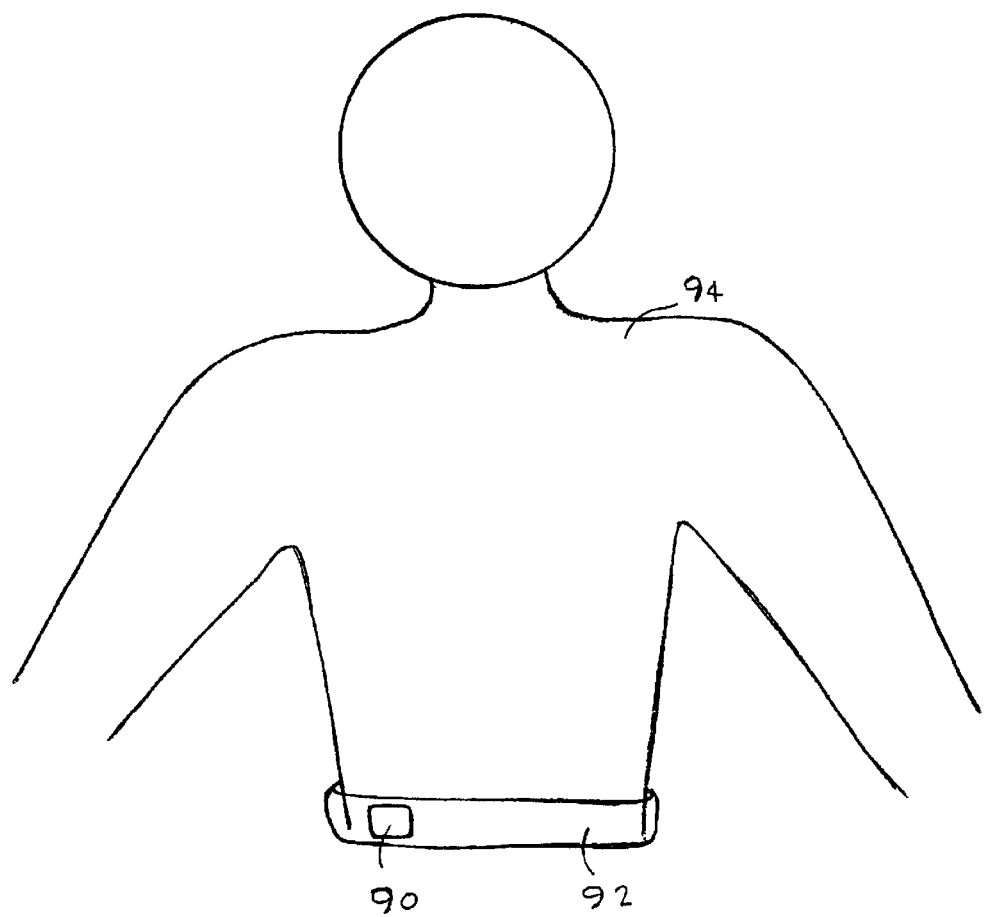
FIG. 14 is a front elevational view of a ninth preferred embodiment according to the present invention showing a remotely activatable electric shock device embodied in a belt.

In a ninth preferred embodiment of the present invention, as shown in FIG. 14, the EMD-technology-containing article 90 is securely retained on a belt 92 worn by a passenger 94.

Figure 15:
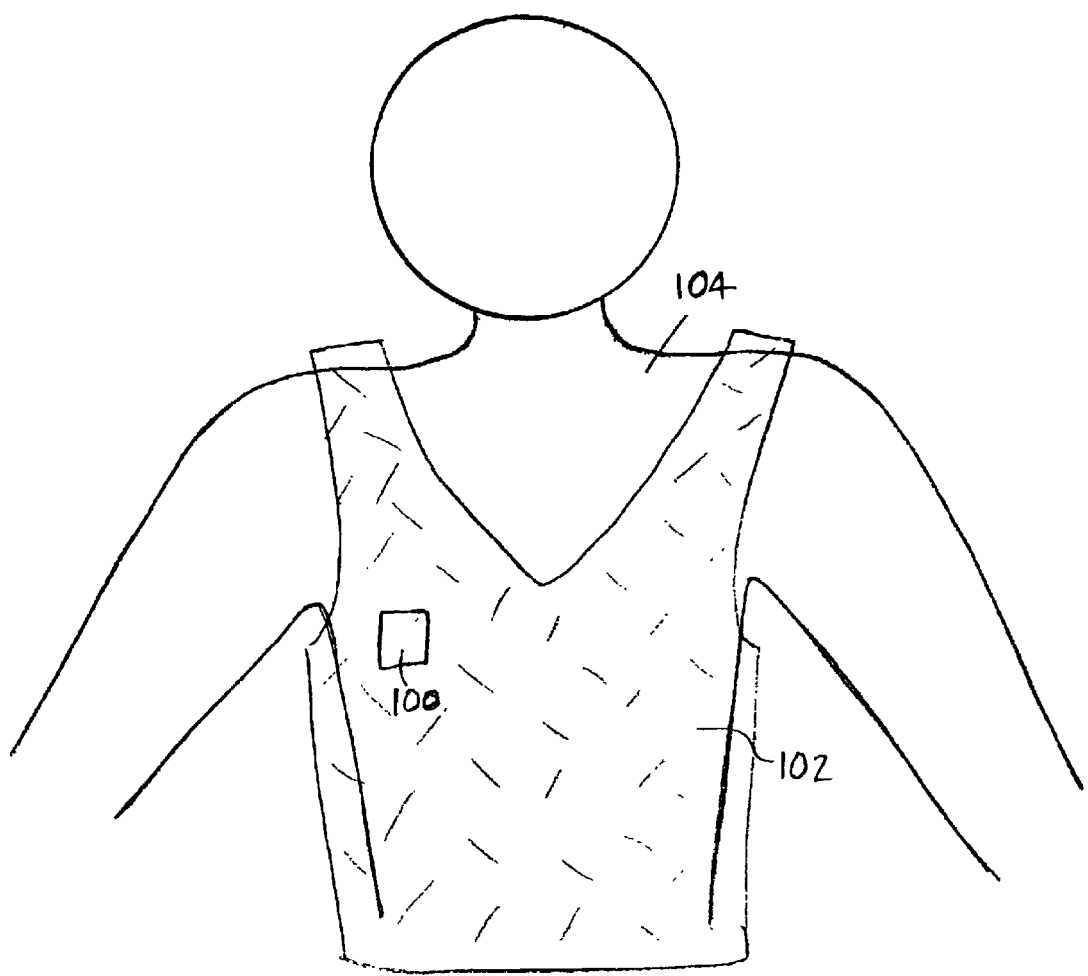
FIG. 15 is a front elevational view of a tenth preferred embodiment according to the present invention showing a remotely activatable electric shock device embodied in a vest; and, FIG. 16 is an elevational view of an eleventh preferred embodiment according to the present invention showing a remotely activatable electric shock device in a necklace worn around a person's neck.

In a tenth preferred embodiment of the present invention, as shown in FIG. 15, the EMD-technology-containing article 100 is securely retained within a vest 102 worn by a passenger 104.

Figure 16:
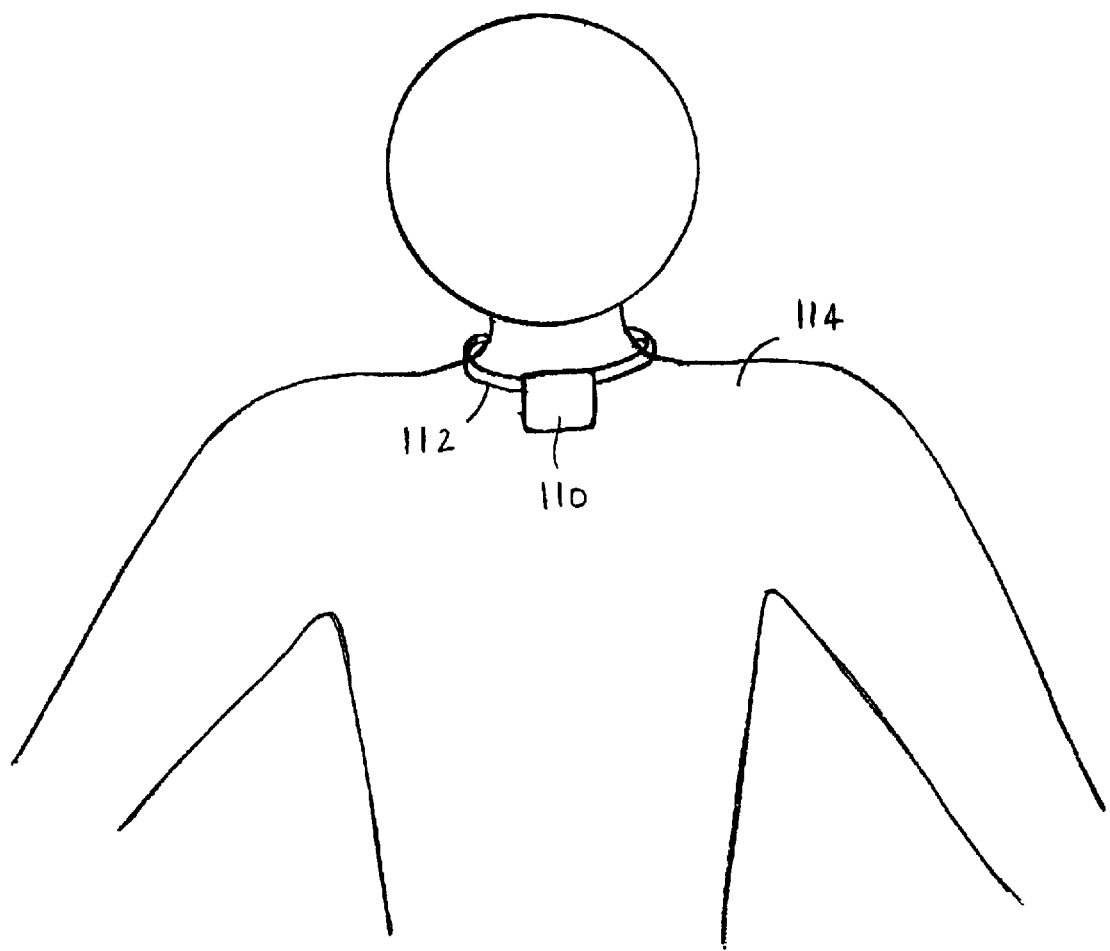

In an eleventh preferred embodiment of the present invention, as shown in FIG. 16, the EMD-technology-containing article 110 is securely retained on a necklace 112 worn by a passenger 114.

The air travel security system 20, the remotely activatable electric shock device 30, and the related air travel security method herein described, all of the present invention, provide a last line of defence against a potential hijacker or terrorist who has actually boarded an aircraft 26. It is the most effective way to fully subdue a passenger without harming that passenger or others, or damaging the aircraft 26.

As can be understood from the above description and from the accompanying drawings, the present invention provides an air travel security method, system and device having a primary purpose to "arrest" hi-jacker/terrorist on a plane and acting in a threatening manner, that has an effective range that covers an entire commercial airliner, wherein physical contact with a selected passenger can readily be made, and wherein it is difficult for a passenger to shield himself from the unit, all of which features are unknown in the prior art.

Other variations of the above principles will be apparent to those who are knowledgeable in the field of the invention, and such variations are considered to be within the scope of the present invention. Further, other modifications and alterations may be used in the design and manufacture of the air travel security method, system and device of the present invention without departing from the spirit and scope of the accompanying claims.

We claim:

1. A method of providing air travel security for passengers traveling via an aircraft, said method comprising the steps of:
   (a) prior to the flight, making a determination of passengers to be monitored during the flight;
   (b) generating a unique flight code for each flight and storing the unique flight code into electronic circuitry of remotely activatable electric shock devices to be worn by the predetermined passengers during the flight wherein the unique flight code is generated in a manner so as to prevent unauthorized use and tampering of the remotely activatable electric shock devices by making it impossible for a predetermined passenger to predict or determine the unique flight code for the flight;
   (c) situating a remotely activatable electric shock device on predetermined passengers to be worn during the flight such that, for each predetermined passenger, the situated electric shock device is in position to deliver a disabling electrical shock to that passenger and reading the unique flight code stored in the electronic circuitry of the remotely activatable electric shock device worn by each predetermined passenger and verifying the unique flight code relative to the flight;
   (d) arming said electric shock devices for subsequent selective activation of said electric shock devices by a selectively operable remote control means, wherein each activated electric shock device situated on a predetermined passenger is operable to deliver said disabling electrical shock to that passenger; and
   (e) subsequent to the flight, removing said electric shock devices from said predetermined passengers.

2. The method of claim 1, including activating an alarm in the event one of the predetermined passengers attempts to remove one of said electronic shock devices during the flight.

3. The method of claim 1, wherein in step (d), said electric shock devices are armed manually by authorized personnel.

4. The method of claim 1, wherein in step (d), said electric shock devices are armed automatically.

5. The method of claim 4, wherein in step (d), a plurality of said electric shock devices are armed concurrently.

6. The method of claim 1, wherein in step (d), said electric shock devices are armed prior to boarding the aircraft.

7. The method of claim 1, wherein in step (c), said electric shock devices are situated in position to deliver a muscular-disruptive electrical shock to each predetermined passenger.

8. The method of claim 1, further comprising the step of, subsequent to step (b), verifying the operability of each said electric shock device to be able to deliver a disabling electrical shock to a predetermined passenger.

9. The method of claim 1, further comprising the step of enabling alarm circuitry on said electric shock devices, which alarm circuitry produces an alarm if one of said electric shock devices is removed from a predetermined passenger, when said one electric shock device is armed.

10. The method of claim 1, wherein in step (c), said remotely selectively activatable electric shock devices are situated on predetermined passengers who are over a specified age.

11. The method of claim 1, wherein in step (c), said remotely selectively activatable electric shock devices are situated on predetermined passengers who are over a specified size.

12. The method of claim 1, further comprising the step of using said electric shock devices for verifying the identity of the predetermined passengers boarding the aircraft.

13. The method of claim 1, further comprising the step of disarming said electric shock devices prior to removing said devices from the predetermined passengers.

14. The method of claim 1, wherein said aircraft is a commercial aircraft.

15. The method of claim 1, further comprising the step of:
   prior to the aircraft departing for the flight, for each of the predetermined passengers, entering information pertaining to the identity of that passenger into the electric shock device situated on that passenger.

16. The method of claim 15, further comprising the step of:
   prior to said aircraft departing for the flight, checking predetermined passenger identity information entered in said remotely activatable electric shock devices.

17. The method of claim 1, further comprising the step of:
randomly generating the unique flight code to be entered into each electric shock device.

18. An air travel security system for providing air travel security for passengers traveling via an aircraft, said air travel security system comprising:
a plurality of remotely activatable electric shock devices each having an armed state wherein said electric shock device produces, upon activation, a disabling electric shock;
said remotely activatable electric shock devices being adapted to be situated, one on each of predetermined passengers during a flight on the aircraft such that, for each predetermined passenger, a situated electric shock device is in position to deliver a disabling electrical shock to that predetermined passenger;
a selectively operable remote control means adapted to be disposed within the aircraft during the flight for producing and transmitting an activating signal for activating said electric shock devices;
each of said remotely activatable electric shock devices having activation circuitry responsive to said activating signal which causes, upon receipt of said activating signal, said remotely activatable electric shock devices to produce a disabling electric shock;
means for coding flight specific information into said remotely activatable electric shock devices wherein said means for coding includes means for generating a unique flight code for each flight and storing the unique flight code into electronic circuitry of the remotely activatable electric shock devices wherein the unique flight code is generated in a manner so as to prevent unauthorized use and tampering of the remotely activatable electric shock devices by making it impossible for a predetermined passenger to predict or determine the unique flight code for the flight; and
means for reading the unique flight code stored in the electronic circuitry of the remotely activatable electric shock device worn on each predetermined passenger and verifying the unique flight code relative to the flight.

19. The air travel security system of claim 18, wherein said electric shock devices include disarming means to preclude them from producing a disabling electric shock upon receipt of said activating signal.

20. The air travel security system of claim 18, wherein each of said electric shock devices includes electro-muscular-disruption technology.

21. The air travel security system of claim 18, wherein said selectively operable remote control means includes radio frequency transmitter circuitry and said activating signal comprises a radio frequency carrier signal transmitted by said radio frequency transmitter circuitry.

22. The air travel security system of claim 18, wherein said selectively operable remote control means includes ultrasonic transmitter circuitry and said activating signal comprises an ultrasonic carrier signal transmitted by said ultrasonic transmitter circuitry.

23. The air travel security system of claim 18, wherein said selectively operable remote control means includes infra-red light transmitter circuitry and said activating signal comprises an infra-red light carrier signal transmitted by said infra-red light transmitter circuitry.

24. The air travel security system of claim 18, wherein said selectively operable remote control means includes laser light transmitter circuitry and said activating signal comprises a laser light carrier signal transmitted by said laser light transmitter circuitry.

25. The air travel security system of claim 18, wherein said selectively operable remote control means includes magnetic field transmitter circuitry and said activating signal comprises a magnetic field carrier signal transmitted by said magnetic field transmitter circuitry.

26. The air travel security system of claim 18, wherein said selectively operable remote control means includes microwave transmitter circuitry and said activating signal comprises a microwave carrier signal transmitted by said microwave transmitter circuitry.

27. The air travel security system of claim 18, wherein each of said remotely activatable electric shock devices comprises a main body in a form of a bracelet.

28. The air travel security system of claim 18, wherein each of said remotely activatable electric shock devices comprise a main body and a strap means secured to said main body.

29. A remotely activatable electric shock device for providing security for passengers traveling via an aircraft, said remotely activatable electric shock device comprising:
a main body;
at least two electrodes protruding from said main body;
electronic circuitry for energizing said electrodes to thereby produce a disabling electric shock;
means for arming said electric shock device whereby said electric shock device produces a disabling electric shock upon activation;
said remotely activatable electric shock device being adapted to be situatable on a passenger during a flight on an aircraft such that said electric shock device is in position to deliver the disabling electric shock to that passenger;
said remotely activatable electric shock device having activation circuitry responsive to an activating signal transmitted from a selectively operable remote control means, which activation circuitry, upon receipt of the activating signal, causes said remotely activatable electric shock device to produce the disabling electric shock;
means for coding flight specific information into said remotely activatable electric shock device wherein said means for coding includes means for storing a unique flight code for each flight into electronic circuitry of the remotely activatable electric shock device wherein the unique flight code prevents unauthorized use and tampering of said remotely activatable electric shock device by making it impossible for a predetermined passenger to predict or determine the unique flight code stored therein; and
means for remotely communicating the unique flight code stored in the electronic circuitry of the remotely activatable electric shock device to a verification device to thereby verify the unique flight code relative to a flight.

30. The remotely activatable electric shock device of claim 29, wherein said electric shock device has an unarmed state whereat said electric shock device is precluded from producing said disabling electric shock upon receipt of said activating signal.

31. The remotely activatable electric shock device of claim 29, wherein each of said electric shock device comprises an electro-muscular-disruption technology device.

32. The remotely activatable electric shock device of claim 29, wherein said activation circuitry is responsive to a radio frequency carrier signal.

33. The remotely activatable electric shock device of claim 29, wherein said activation circuitry is responsive to an ultrasonic carrier signal.

34. The remotely activatable electric shock device of claim 29, wherein said activation circuitry is responsive to an infra-red light carrier signal.

35. The remotely activatable electric shock device of claim 29, wherein said activation circuitry is responsive to a laser light carrier signal.

36. The remotely activatable electric shock device of claim 29, wherein said activation circuitry is responsive to a magnetic field carrier signal.

37. The remotely activatable electric shock device of claim 29, wherein said activation circuitry is responsive to a microwave carrier signal.

38. The remotely activatable electric shock device of claim 29, wherein said main body of said remotely activatable electric shock device is in a form of a bracelet.

39. The remotely activatable electric shock device of claim 38, wherein said bracelet is movable between a closed in-use configuration and an opened situating configuration.

40. The remotely activatable electric shock device of claim 39, wherein said remotely activatable electric shock device comprises alarm circuitry, which alarm circuitry produces an alarm if said bracelet is removed from its closed in-use configuration, when said electric shock device is in an armed condition.

41. The remotely activatable electric shock device of claim 40, wherein said alarm circuitry produces an audible alarm.

42. The remotely activatable electric shock device of claim 40, wherein said alarm circuitry transmits said alarm via a radio frequency carrier signal.

43. The remotely activatable electric shock device of claim 29, wherein said remotely activatable electric shock device includes a strap means secured to said main body.

44. The remotely activatable electric shock device of claim 43, wherein said strap means is movable between a closed in-use configuration and an open situating configuration.

45. The remotely activatable electric shock device of claim 44, wherein said remotely activatable electric shock device comprises alarm circuitry, which alarm circuitry produces an alarm if said strap means is removed from its closed in-use configuration, when said electric shock device is in an armed condition.

46. The remotely activatable electric shock device of claim 45, wherein said alarm circuitry produces an audible alarm.

47. The remotely activatable electric shock device of claim 45, wherein said alarm circuitry transmits said alarm via a radio frequency carrier signal.

48. The remotely activatable electric shock device of claim 29, wherein said electric shock device comprises digital electronic circuitry for storing digital information pertaining to the identity of that passenger, and a display for displaying said digital information.

49. A method of providing air travel security for passengers traveling on an aircraft comprising the steps of:

(a) Receiving passengers into a pre-flight area prior to permitting passengers to board the aircraft for a flight;

(b) placing a remotely activatable electric shock device on predetermined passengers to be worn during the flight such that, for each predetermined passenger, the situated electric shock device is in position to deliver a disabling electrical shock to that passenger; and (c) either prior to or after placing the electric shock devices on the predetermined passengers, associating remotely readable information with the electric shock devices which is flight specific including generating a unique flight code for each flight and storing the unique flight code into electronic circuitry of the remotely activatable electric shock devices to be worn by the predetermined passengers during the flight wherein the unique flight code is generated in a manner so as to prevent unauthorized use and tampering of the remotely activatable electric shock devices by making it impossible for a predetermined passenger to predict or determine the unique flight code for the flight;

(d) reading the unique flight code stored in the electronic circuitry of the remotely activatable electric shock device worn on each predetermined passenger and verifying the unique flight code relative to the flight;

(e) providing means on the aircraft for selectively activating the electric shock devices when the predetermined passengers are on the aircraft.

50. The method of claim 49, including randomly generating the unique flight code.

51. The method of claim 49, wherein said associating of flight specific information includes providing information concerning the identification of the predetermined passengers wearing said electric shock devices.

52. The method of claim 51, wherein the providing of information concerning the identification of the predetermined passengers includes inputting a digital photograph of the passengers, and providing a visual display for verification of predetermined passengers identities by visual inspection.

53. The method of claim 51, including using said electric shock devices as aircraft boarding passes and scanning said electric shock devices as the predetermined passengers board the aircraft.

54. The method of claim 51, including scanning said electric shock devices after said predetermined passengers have been seated on the aircraft to thereby verify passenger seating assignments.

55. The method of claim 49, including arming said electric shock devices and visually indicating when the electric shock devices are armed.

56. The method of claim 49, further comprising the step of producing an alarm if said remotely activatable electric shock device is removed from a predetermined passenger.

57. A remotely activatable device for providing security for passengers traveling via an aircraft, said remotely activatable device comprising:

an electric shock device including a body adapted to be worn on a predetermined passenger during a flight of the aircraft, said electric shock device having means for producing a disabling electric shock upon activation, said electric shock device having activation circuitry responsive to an activating signal transmitted from a selectively operable remote control means, which activation circuitry, upon receipt of said activating signal, causes said electric shock device to produce said disabling electric shock, means for associating remotely readable flight specific information into said electric shock device, said means for associating including electronic circuitry for storing a unique flight code for each flight wherein the unique flight code prevents unauthorized use and tampering of the remotely activatable electric shock device by making it impossible for a predetermined passenger to predict or determine the unique flight code for the flight; and means for communicating the unique flight code stored in the electronic circuitry to a remote location for verification.

58. The remotely activatable device of claim 57, wherein said electric shock device includes alarm circuitry that produces an alarm if said electric shock device is removed from the predetermined passenger.

59. The remotely activatable device of claim 57 wherein said flight specific information includes at least one of the following:
   A. flight number of the aircraft;
   B. personal identification information concerning the predetermined passenger; and
   C. seat location for the predetermined passenger.

* * * * *